United States Patent [19]

Vasta

[11] 3,819,472

[45] June 25, 1974

[54] COATING COMPOSITION OF AN AROMATIC POLYSULFONE RESIN, AN EPOXY RESIN, AND N-CYCLOHEXYL TOLUENE SULFONAMIDE

[75] Inventor: Joseph A. Vasta, Woodbury, N.J.

[73] Assignee: E. I. duPont de Nemours and Company, Wilmington, Del.

[22] Filed: Mar. 13, 1973

[21] Appl. No.: 340,847

[52] U.S. Cl.............. 161/185, 117/232, 161/186, 260/30.8 R, 260/830 S
[51] Int. Cl............................................ C08g 51/04
[58] Field of Search................ 260/830 S, 30.8 R; 161/185, 186; 117/232

[56] References Cited
UNITED STATES PATENTS 3,530,087   9/1970   Hayes et al.............. 260/830 S X

OTHER PUBLICATIONS

G. G. Hawley, ed., The Condensed Chemical Dictionary, 8th edition, (1971), p. 254.

*Primary Examiner*—Allan Lieberman
*Assistant Examiner*—S. M. Person

[57] ABSTRACT

The novel coating composition is a mixture of an aromatic polysulfone resin and an epoxy resin and is useful as an adhesive and as a protective coating composition for wood, metal, wire, glass and plastics; finishes of the novel composition have excellent stain resistance, good thermal stability, scratch, mar and impact resistance and are useful as an appliance finish, a vending machine finish and an industrial equipment finish.

8 Claims, No Drawings

COATING COMPOSITION OF AN AROMATIC POLYSULFONE RESIN, AN EPOXY RESIN, AND N-CYCLOHEXYL TOLUENE SULFONAMIDE

BACKGROUND OF THE INVENTION

This invention relates to a coating composition, and in particular, to a coating composition of a polysulfone and an epoxy resin.

Appliances such as stoves, electrical motors, and industrial equipment require heat resistant finishes that are durable, flexible and scratch resistant and have a good appearance. Coatings of aromatic polysulfone resins have good thermal stability but it has not been possible to prepare glossy, flexible finishes from these resins. Typically useful polysulfone resins are shown by Vogel U.S. Pat. No. 3,321,449, issued May 23, 1967; D'Alessandro U.S. Pat. No. 3,355,272, issued Nov. 28, 1967; Cohen et al. U.S. Pat. No. 3,518,235, issued June 30, 1970; Pietrusza et al. U.S. Pat. No. 3,536,665, issued Oct. 27, 1970. Epoxy resins are well known in the art and have been widely used in adhesive, paints and the like. A tough, durable, scratch resistant finish is required by industry today for applications which also require the finish to have excellent thermal stability. The novel coating composition of this invention has these aforementioned properties and also has excellent adhesion to all types of substrates and forms a high quality finish.

The novel coating composition of this invention utilizes an epoxy resin with the polysulfone resin to form a thermally stable finish that is tough, durable and scratch resistant and has excellent adhesion to all types of primed and unprimed metal substrates. Furthermore, the finish has a glossy, high quality appearance which makes the finish particularly useful for appliances such as stoves and refrigerators.

SUMMARY OF THE INVENTION

The coating composition of this invention comprises a solution of 5-60 percent by weight of a binder of a polymer blend and correspondingly, 40-95 percent by weight of a solvent for the polymer blend; wherein the polymer blend consists essentially of 1. 85-99 percent by weight, based on the weight of the polymer blend, of a polysulfine resin of the formula

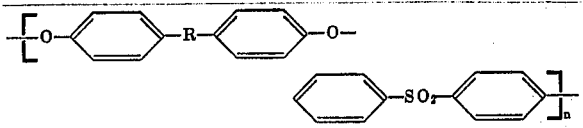

where R is an alkylene group having 1-6 carbon atoms and n is from 50-120; and correspondingly;

2. 1-15 percent by weight, based on the weight of the polymer blend, of an epoxy resin of the formula

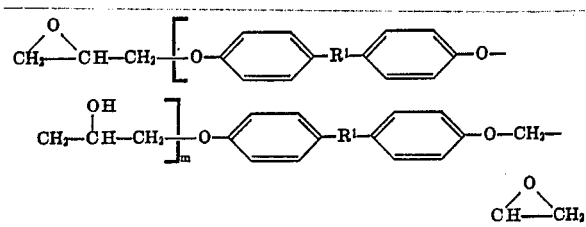

where $m$ is a positive integer sufficiently large to give an epoxide equivalent* of 180 to 2,500 and $R^1$ is an alkylene group of 1-4 carbon atoms.

*The epoxide equivalent of the epoxy resin is the grams of resin that contain 1 gram equivalent of epoxide.

DESCRIPTION OF THE INVENTION

The novel coating composition of this invention preferably contains about 10-40 percent by weight of the binder of a film-forming polymer blend. The composition can be pigmented in a pigment to binder ratio of about 1:100 to about 200:100. Preferably, the novel coating composition of this invention has as the film-forming blend 91-97 percent by weight of the polysulfone resin, and correspondingly, 3-9 percent by weight of the epoxy resin.

The polysulfone resin used in the novel composition of this invention has repeating units of the formula

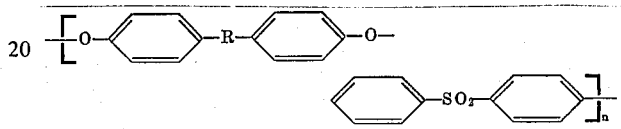

where R is an alkylene group of 1-6 carbon atoms and $n$ is from 50-120. In one preferred polysulfone resin of the type that forms a high quality composition, R is

and n is from 50-80. This preferred resin can be prepared according to Example 1 of the above D'Alessandro U.S. Pat. No. 3,355,272.

The epoxy resins that are utilized in the novel coating composition of this invention are the reaction products of bisphenol and epichlorohydrin and having the following structural formula

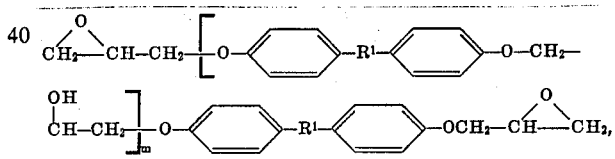

where $R^1$ is an alkylene radical having 1-4 carbon atoms and $m$ is a positive integer sufficiently large to provide an epoxide equivalent of 180 to 2,500. Preferably, $R^1$ is either $CH_2$ or

and the epoxide equivalent is 180–1,025.

One preferred epoxy resin is the reaction product of epichlorohydrin and bisphenol A which provies a resin in which $R^1$ is isopropylidine. This particular epoxy resin gives a finish with desirable physical properties such as toughness and durability.

Another very useful epoxy resin that gives a quality finish is the reaction product of epichlorohydrin and bisphenol F which provides a resin in which $R^1$ is methylene.

Up to 14 percent by weight, based on the weight of the polymer blend, of an aromatic polysulfonamide can be utilized in the novel coating composition of this invention to provide a finish with a slippery surface and that has release properties. Preferably, 4–10 percent by weight of the aromatic polysulfonamide is used to form this composition. The aromatic sulfonamide is of the general formula $$R^2 - SO_2 - NH - R^3$$

wherein $R^2$ is a monovalent aromatic radical and $R^3$ is either hydrogen, a monovalent cycloaliphatic radical or an alkyl group having 1–18 carbon atoms. Typical resins are for example:

para toluene sulfonamide,
N-methyl para toluene sulfonamide,
N-ethyl para toluene sulfonamide,
N-propyl para toluene sulfonamide,
N-butyl para toluene sulfonamide,
N-hexyl para toluene sulfonamide,
N-octyl para toluene sulfonamide,
N-nonyl para toluene sulfonamide,
N-dodecyl para toluene sulfonamide,
N-lauryl para toluene sulfonamide,
N-tridecyl para toluene sulfonamide,
N-quadra decyl para toluene sulfonamide,
N-stearyl para toluene sulfonamide,
benzene sulfonamide,
naphthalene sulfonamide,
N-cyclohexyl toluene sulfonamide, and the like.

One particularly preferred aromatic sulfonamide that forms a finish with excellent properties is N-cyclohexyl toluene sulfonamide.

One preferred composition of this type contains 85–95 percent weight of the polysulfone resin, 1–5 percent by weight of the epoxy resin and 4–10 percent weight of aromatic polysulfonamide resin.

The novel composition is prepared by mixing the polysulfone resin and the epoxy resin in a conventional solvent or a blend of solvents. Another method is to prepare a solution of the polysulfone resin and a solution of the epoxy resin and then blend the solutions together to form the novel composition. The other aforementioned constituents can then be added or all of the constituents can be added and blended in one step.

The following are typical solvents that are useful in preparing the novel composition: methylene chloride, trichloroethylene, cyclohexanone, chloroform, chlorobenzene, tetrachloroethylene, 1,1,2,2-tetrachloroethane, xylene, N-methyl pyrrolidone, dimethyl formamide, dimethyl acetamide, isophorone and other hydrocarbon solvents.

The novel coating composition of this invention can be pigmented as indicated above. Pigments can be blended with the novel composition and then ground by conventional techniques, such as sand milling, pebble milling or ball milling to uniformly disperse the pigment in the composition. Preferably, the pigment is formed into a mill base by grinding the pigment with either a solution of the polysulfone resin or a solution of the epoxy resin or a solution of both of the above resins. Preferably, the epoxy resin is used to prepare the mill base. The mill base is then blended with the novel composition.

The following are examples of the great variety of pigments which can be used in the novel coating composition of this invention: metallic oxides, preferably titanium dioxide, zinc oxide, and the like, metal hydroxides, metal flakes, metal powders, sulfides, sulfate, carbonates, carbon black, silica, silicates, hydrophobic silicates, such as silicone treated with silicone dioxide, talc, china clay, iron oxide, iron blues, organic reds, maroons and other organic dyes and lakes.

Conventional plasticizers such as butylbenzyl phthalate can be used in the novel composition in amounts of 1–10 percent by weight.

The novel compositions of this invention can be applied to a variety of substrates, for example, metal, glass or plastics by any of the usual application methods, such as spraying, electrostatic spraying, dipping, brushing, flow coating, roller coating, reverse roller coating, coil coating and the like. These coatings are baked at about 150°–400° C. for about 5 minutes to 2 hours. The resulting coating is about 0.1–5 mils thick and preferably, 1–3 mils thick.

The novel coating composition of this invention has excellent adhesion to bare or treated metals or to metals which have been previously primed or painted with alkyd, epoxy or acrylic enamels. Also, the novel composition can be a highly pigmented coating or can be used as a clear coating.

Finishes of the novel composition have particularly excellent physical properties such as good electrical properties, stain resistance, water repellency, excellent adhesion to primed and unprimed metal substrates, toughness, hardness, crack and mar resistance. The composition is particularly useful as a wire enamel, as a coating for range parts, plumbing fixtures such as sinks, and as a clear coating for hardware items, such as saws, chisels, planes, knives, as a coating for films, such as polyester films to improve electrical and thermal properties. Also, the coating composition can be utilized as a primary finish for refrigerators, stoves, washers, dryers and the like. The novel composition can be used to form structural bonds by coating both sides of interlocking structural members and heating to form the bond.

The novel composition can also be used as an adhesive for metals, glass and high temperature resistant plastics and can be used to form laminates for example of metal to plastic or to fiberglas reinforced plastics. Also the novel composition can be used an an impregnant for a variety of fibrous sheet structures for example, circuit boards can be formed by impregnating and laminating together fiberglas sheets with the novel composition of this invention. The printed metal foil circuit can be laminated to a circuit board using the novel composition of this invention.

The following Examples illustrate this invention. The parts and percentages are by weight unless otherwise specified.

EXAMPLE 1

A coating composition is prepared by blending the following ingredients:

Parts By Weight

Polysulfone resin solution (20% solids in cyclohexanone of a polysulfone of the formula

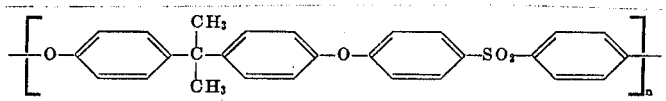

where $n$ is from 50–80).
Epoxy resin (having the following structural formula 100.0

$$CH_2\!-\!\!\overset{O}{\underset{}{\diagdown}}\!\!CH\!-\!CH_2\!-\!\!\left[\!O\!-\!\!\bigcirc\!\!-\!\!\underset{CH_3}{\overset{CH_3}{\underset{|}{C}}}\!\!-\!\!\bigcirc\!\!-\!O\!-\!CH_2\!-\!\underset{\underset{OH}{|}}{CH}\!-\!CH_2\!-\!\right]_{\!n}\!O\!-\!\bigcirc\!\!-\!\underset{CH_3}{\overset{CH_3}{\underset{|}{C}}}\!\!-\!\!\bigcirc\!\!-\!OCH_2\!-\!CH\!\!\overset{O}{\underset{}{\diagup\diagdown}}\!\!CH_2$$

where $n$ is a positive integer sufficiently large to provide the resin with an epoxide equivalent of 180–195).

1.0

| | Parts By Weight |
|---|---|
| Dimethyl polysiloxane-diphenylpolysiloxane resin solution (2% solids in methyl pyrrolidone where the resin has a viscosity of 20,000 centistokes) | 4.0 |
| Total | 105.0 |

The above ingredients are thoroughly blended together to form a coating composition. A 10 mil thick coating is applied to an aluminum substrate with a doctor blade and baked for 30 minutes at 200° C. The resulting coating is clear, tough, scratch and abrasion resistant and has good thermal stability.

EXAMPLE 2

A coating composition is prepared as follows:

| | Parts By Weight |
|---|---|
| Polysulfone resin solution (20% solids in cyclohexanone of the polysulfone resin described in Example 1) | 250 |
| Epoxy resin (described in Example 1) | 25 |
| N-cyclohexyl toluene sulfonamide solution (50% solids in cyclohexanone) | 50 |
| Total | 325 |

The above constituents are thoroughly blended together to form a coating composition.

The above coating composition is applied by a doctor blade to separate steel panels having a phosphatized surface and the panels are baked at 200° C. for 30 minutes. Each of the panels has a tough, durable, scratch resistant and thermal resistant coating.

EXAMPLE 3

A polysulfone resin solution is prepared as follows:

| | Parts By Weight |
|---|---|
| Polysulfone resin (described in Example 1) | 100 |
| Cyclohexanone | 400 |
| Total | 500 |

The above ingredients are charged into a reflux condenser and heated to reflux and held at 130°–135° C. for about 8 hours.

A white mill base is then prepared as follows:

| | Parts By Weight |
|---|---|
| Titanium dioxide pigment | 480 |
| Epoxy resin (described in Example 1 except the resin has an epoxide equivalent of 450–550) | 80 |
| Isophorone | 310 |
| Hydrocarbon solvent having a boiling point of 182–219°C. | 130 |
| Total | 1,000 |

The above ingredients are blended together and then charge into a sand mill and ground to form a uniform pigment dispersion.

A coating composition then is prepared by blending together the following ingredients:

| | Parts By Weight |
|---|---|
| White Mill Base (prepared above) | 104.2 |
| Polysulfone resin solution (prepared above) | 470.0 |
| Butyl benzyl phthalate | 5.0 |
| Isophorone | 13.9 |
| Hydrocarbon solvent having a boiling point of 182–219°C. | 6.9 |
| Total | 600.0 |

The above coating composition is reduced to a spray viscosity and sprayed onto phosphatized steel panels and baked for 60 minutes at 275° C. The resulting finish has a 60° gloss of 89 and a 20° gloss of 36. The finish is flexible and will withstand a right angle bend without cracking. The finish also is resistant to solvents such as methylethyl ketone.

The invention claimed is:

1. A coating composition comprising 5–60 percent by weight of a binder of a polymer blend and a solvent for the polymer blend; wherein the polymer blend consists essentially of
   1. 85–95 percent by weight; based on the weight of of the polymer blend, of a polysulfone resin of the formula $$\left[\!O\!-\!\!\bigcirc\!\!-\!\underset{CH_3}{\overset{CH_3}{\underset{|}{C}}}\!\!-\!\!\bigcirc\!\!-\!O\!-\!\bigcirc\!\!-\!SO_2\!-\!\bigcirc\!\right]_{\!n}$$

where $n$ is from 50–80;
   2. 4–10 percent by weight based on the weight of of the polymer blend, of N-cyclohexyl toluene sulfonamide;
   3. 1–5 percent by weight, based on the weight of the polymer blend, of an epoxy resin of the formula $$CH_2\!-\!\!\overset{O}{\underset{}{\diagdown}}\!\!CH\!-\!CH_2\!-\!\!\left[\!O\!-\!\!\bigcirc\!\!-\!\underset{CH_3}{\overset{CH_3}{\underset{|}{C}}}\!\!-\!\!\bigcirc\!\!-\!O\!-\!CH_2\!-\!\underset{\underset{OH}{|}}{CH}\!-\!CH_2\!-\!\right]_{\!m}\!O\!-\!\bigcirc\!\!-\!\underset{CH_3}{\overset{CH_3}{\underset{|}{C}}}\!\!-\!\!\bigcirc\!\!-\!OCH_2\!-\!CH\!\!\overset{O}{\underset{}{\diagup\diagdown}}\!\!CH_2,$$

where $m$ is a positive integer sufficient to provide an epoxide equivalent of 180–1,025.

2. An article comprising a metal substrate having at least one side coated with 0.1–5 mils of a dried coalesced layer of the coating composition of claim 1.

3. The article of claim 2 in which the metal substrate is an electrical conductor.

4. The article of claim 2 in which the metal substrate is aluminum.

5. An article comprising a fiberglas sheet impregnated with the dried coalesced composition of claim 1.

6. The article of claim 5 having in superimposed adherence therewith an electrically conductive metal sheet.

7. A laminate comprising at least two sheets of metal being firmly adhered together with a dried coalesced layer of the composition of claim 1.

8. A laminate comprising at least two sheets of a heat resistant plastic being firmly adhered together with a dried coalesced layer of the composition of claim 1.

* * * * *